United States Patent Office 3,173,924
Patented Mar. 16, 1965

3,173,924
PROCESS FOR THE PRODUCTION OF N-CHLORO LOWER ALKYL-2-OXAZOLIDONES
Herbert Arnold, Bielefeld, and Heinz Bekel, Brackwede, Germany, assignors to Asta-Werke Aktiengesellschaft, Brackwede, Germany, a corporation of Germany
No Drawing. Filed Aug. 10, 1964, Ser. No. 389,821
Claims priority, application Germany, Oct. 11, 1961, A 38,547
3 Claims. (Cl. 260—307)

The application is a continuation-in-part of the patent application Ser. No. 229,224, filed October 8, 1962, and entitled: Process for the Production of N-Chloroalkyl-2-Oxazolidones, now abandoned.

This invention relates to a process for the production of N-chloroethyl and propyl-2-oxazolidones.

N-(2-chloroethyl) oxazolidone is an important intermediate for the production of N-vinyl oxazolidone, which may be obtained by splitting off HCl in a manner known per se, for instance, by treatment with sodium monoxide in benzene at an elevated temperature. Furthermore, N-chloro lower alkylated oxazolidones in general are valuable reactants for other organic syntheses.

Therefore, it is an object of the present invention to provide an improved and technically simple process for producing these compounds which may be readily carried out on a commercial scale.

Further objects of the present invention and advantages thereof will become apparent as the description proceeds.

It has been found that the ring closure to give N-chloro lower alkyl oxazolidones of the general Formula I

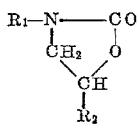

wherein $R_1$ represents a member selected from the group consisting of the chlorine-containing lower alkyl groups containing 2 and 3 carbon atoms, $R_2$ represents a member selected from the group consisting of hydrogen, the alkyl groups containing from 1 to 8 carbon atoms, and such alkyl radical substituted by chlorine, can be carried out in a very simple manner and with good yields by reacting a member selected from the group consisting of a secondary chlorinated aliphatic amine of the general Formula II

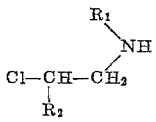

wherein $R_1$ and $R_2$ have the previously specified meanings, and an acid addition salt thereof, with a water-soluble salt of carbonic acid, preferably an alkali metal salt thereof, in an aqueous medium at a temperature between room temperature and the boiling point of the reaction mixture and separating the resulting N-chloro lower alkyl-2-oxazolidone from the reaction mixture. Preferably, an alkali metal bicarbonate, and most preferably sodium bicarbonate is used as a water-soluble salt of carbonic acid and 1 mol of the halogenated secondary amine of Formula II is reacted with 2 mols of the bicarbonate together with sodium hydroxide in an amount sufficient to liberate the free amine base.

In the Formulae I and II $R_1$ and $R_2$ preferably are alkyl groups containing 1 chlorine atom.

Instead of bicarbonates, it is possible to employ water-soluble carbonates. Alkali metal carbonates, for example sodium carbonate, are particularly preferred. When a water-soluble carbonate is employed it is not necessary additionally to add an alkali metal hydroxide to the reaction solution. 2 mols of the carbonate are reacted with 1 mol of the amine salt. In the process according to the present invention, the chloroalkylamine may also be employed in the form of the free base. On account of the physiological properties of the free bases, however, it is preferred to employ water-soluble acid addition salts. Instead of working in water, it is also possible to work in an aqueous organic solvent. When reacting β-halogeno lower alkyl amine compounds of Formula II the reaction is to carry out at or slightly above room temperature while with the γ-halogeno lower alkyl amine compounds it is preferable to work at an elevated temperature such as the boiling point of the reaction mixture. If for instance the readily available bis-(2-chloroethyl) amine (I, $R_2$=—$CH_2CH_2Cl$, $R_2$=H)

is employed in the process according to the present invention N-chloroethyl oxazolidone is formed merely by allowing the reaction mixture to stand at room temperature for 1 hour. The yield is 90% of the theoretical. The product can be completely extracted from the aqueous reaction solution in a simple manner with a suitable organic solvent, for example methylene chloride. No disturbing by-products or discolorations are formed, so that the resulting product can be obtained in a completely pure form by simple distillation.

In order that the invention may be more clearly understood the following examples are given by way of illustration only:

EXAMPLE 1

*N-(2-chloroethyl)-2-oxazolidone*

357 g. of bis-(2-chloroethyl) amine hydrochloride were introduced at room temperature into a solution of 336 g. of sodium bicarbonate and 80 g. of sodium hydroxide in 2 litres of water. The solution was then maintained at 37° C. for 1 hour and thereafter extracted 5 times with methylene chloride, using 100 ml. of methylene chloride on each occasion.

The combined extracts were dried over sodium sulphate. The oil which remained after the solvent had been evaporated off was distilled under reduced pressure. There were thus obtained 268.8 g. of N-(2-chloroethyl)-2-oxazolidone.

B.P.$_{0.3 mm. Hg}$=114° C.; $n_D^{25}$=1.4875.

The yield was 90% of the theoretical.

EXAMPLE 2

The procedure was as described in Example 1. N-(2-chloropropyl)-2-oxazolidone was obtained from N-(2-chloroethyl)-N-(2-chloropropyl) amine by heating it at 100° C. for 6 hours.

B.P.$_{0.5 mm. Hg}$=107–108° C.; $n_D^{25}$=1.4795.

The yield was 83.2% of the theoretical.

EXAMPLE 3

The procedure was as described in Example 1. N-(3-chloropropyl)-2-oxazolidone was obtained from N-(2-chloroethyl)-N-(3-chloropropyl) amine by heating it at 37° C. for 2½ hours.

B.P.$_{0.5 mm. Hg}$=132–135° C.; $n_D^{20}$=1.4878.

The yield was 82% of the theoretical.

EXAMPLE 4

The procedure was as described in Example 1. N-(3-chloropropyl)-5-methyl-2-oxazolidone was obtained from N-(2-chloropropyl)-N-(3-chloropropyl) amine by heating it at 37° C. for 15 hours.

B.P.$_{0.1\text{ mm. Hg}}$=112–114° C.; $n_D^{24}$=1.4772.
The yield was 50% of the theoretical.

What we claim is:

1. A process for the production of N-chloro lower alkyl-2-oxazolidones of the Formula I

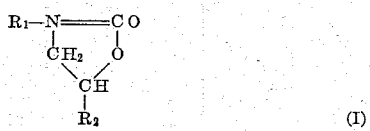

wherein $R_1$ represents a member selected from the group consisting of the chlorine-containing lower alkyl groups containing 2 and 3 carbon atoms, $R_2$ represents a member selected from the group consisting of hydrogen, the alkyl groups containing from 1 to 8 carbon atoms, and such alkyl groups substituted by chlorine, which comprises reacting a member selected from the group consisting of a secondary chlorinated aliphatic amine of the general Formula II

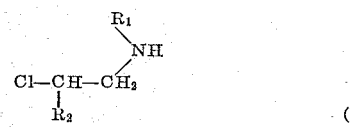

wherein $R_1$ and $R_2$ have the previously specified meanings, and an acid addition salt thereof, with a water-soluble salt of carbonic acid in an aqueous medium at a temperature between room temperature and the boiling point of the reaction mixture and separating the resulting N-chloroalkyl-2-oxazolidone from the reaction mixture.

2. A process as claimed in claim 1, wherein 1 mol of an acid addition salt of the secondary chlorinated aliphatic amine of the Formula II is reacted with 2 mols of an alkali metal bicarbonate and 1 mol of sodium hydroxide.

3. A process as claimed in claim 1, wherein 1 mol of a salt of the secondary chlorinated aliphatic amine of the Formula II is reacted with 2 mols of an alkali metal carbonate.

No references cited.

NICHOLAS S. RIZZO, *Primary Examiner*.